(12) United States Patent
Khubani

(10) Patent No.: US 7,213,342 B2
(45) Date of Patent: May 8, 2007

(54) WALL MOUNTABLE LASER LEVEL

(75) Inventor: Anand Khubani, Towaco, NJ (US)

(73) Assignee: Ideavillage Products Corp., Fairfield, NJ (US)

( * ) Notice: Subject to any disclaimer, the term of this patent is extended or adjusted under 35 U.S.C. 154(b) by 466 days.

(21) Appl. No.: 10/808,874

(22) Filed: Mar. 22, 2004

(65) Prior Publication Data

US 2005/0206891 A1 Sep. 22, 2005

(51) Int. Cl.
*G01C 5/001* (2006.01)

(52) U.S. Cl. ........................................ 33/290

(58) Field of Classification Search ............ 33/286, 33/227, 228, 281–283, 285, 451, 347, 755, 33/761, 769, 668; 362/119, 253, 259, 362, 362/339, 340; 200/61.62, 10, 61.82
See application file for complete search history.

(56) References Cited

U.S. PATENT DOCUMENTS

2004/0258126 A1* 12/2004 Levine ...................... 372/109
2005/0022399 A1* 2/2005 Wheeler et al. .............. 33/286

* cited by examiner

*Primary Examiner*—Hwa (Andrew) Lee
(74) *Attorney, Agent, or Firm*—Epstein Drangel Bazerman & James; Robert L. Epstein

(57) ABSTRACT

A laser level is adapted to direct a laser path against a working surface. The level comprises a base, the base comprising at least one pair of opposing edges, the base adapted to be positioned relative to the working surface such that each of the opposing edges is adjacent to the working surface. The level comprises an adhesive layer, the adhesive layer being situated on the base so as to removably affix the base on the working surface without damaging the working surface. The level comprising an activating switch, the switch being located on the level at a location offset from the laser path.

7 Claims, 5 Drawing Sheets

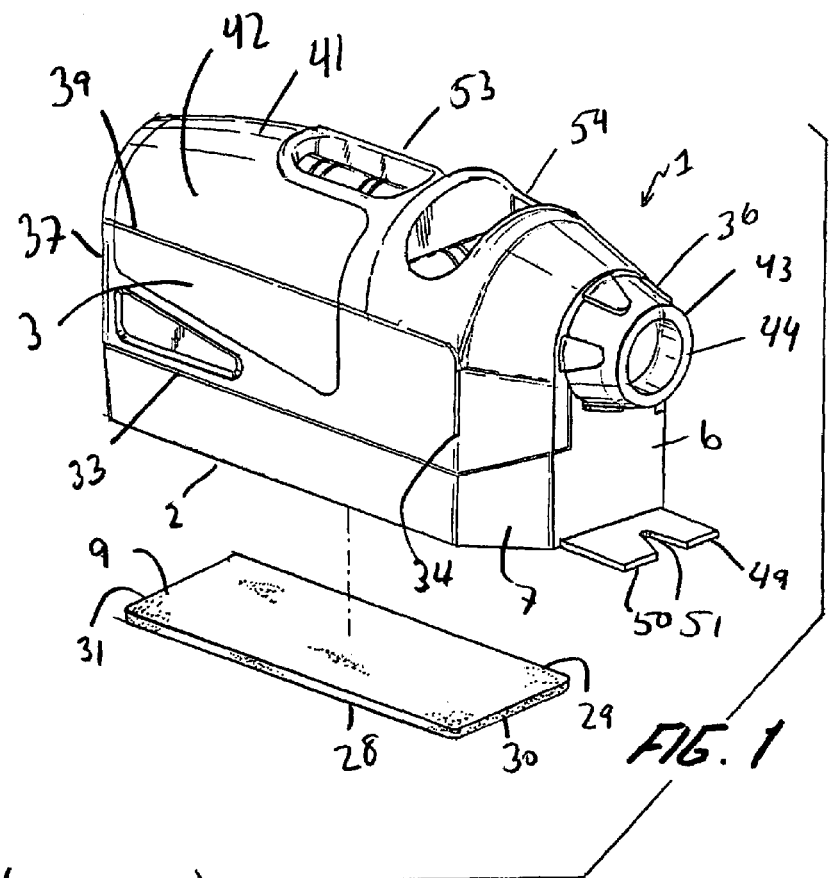
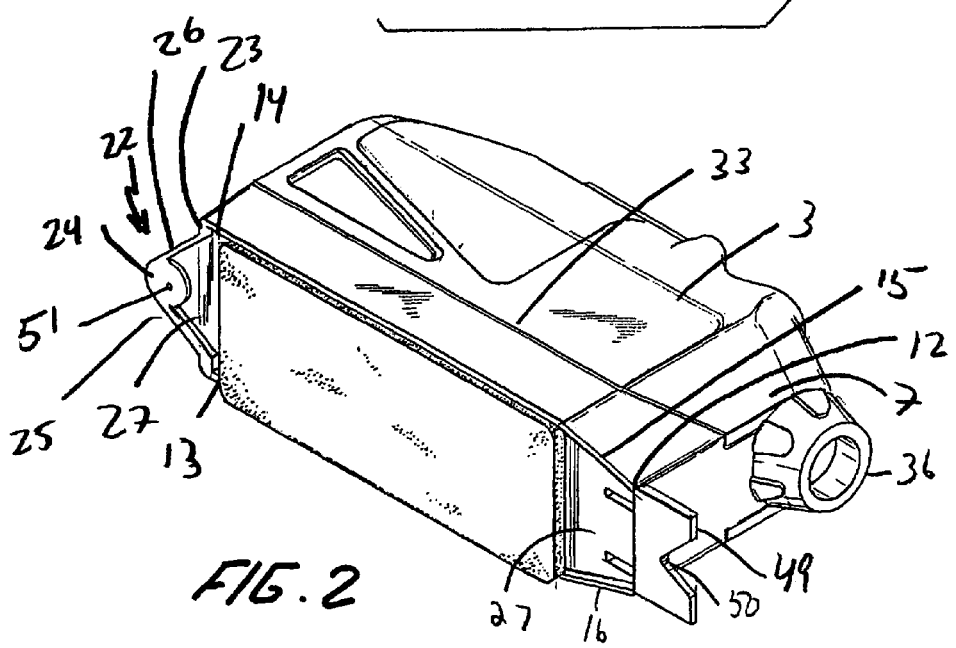

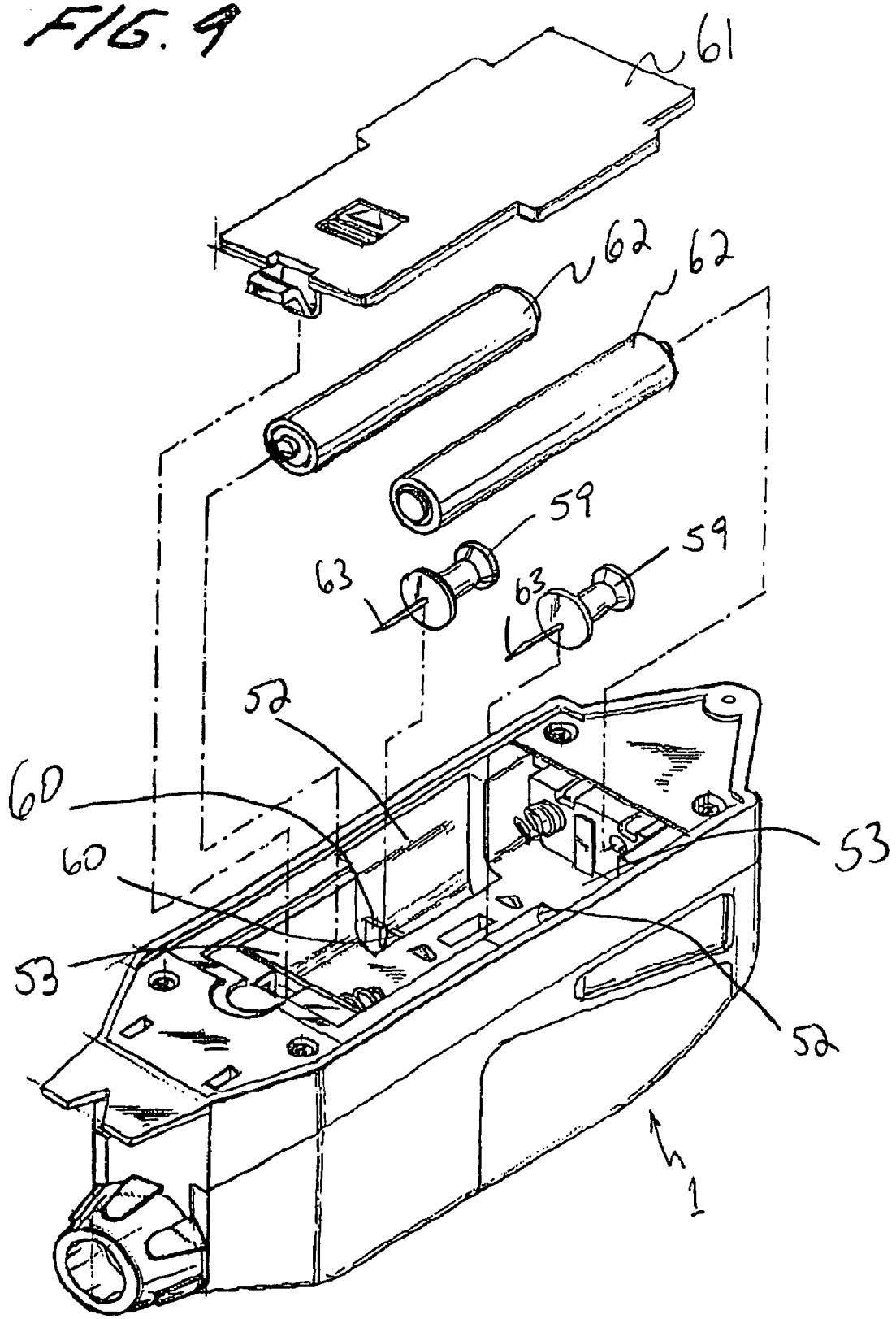

WALL MOUNTABLE LASER LEVEL

FIELD OF THE INVENTION

The present invention relates generally to laser leveling instruments, and more particularly to a wall mountable laser level.

BACKGROUND OF THE INVENTION

Alignment of surfaces is a concern in a variety of fields, ranging from construction to interior decorating. Alignment is necessary for walls that should be perpendicular to a floor, or otherwise plumb. Vertical or horizontal alignment is especially important for pictures and other wall ornamentation.

Many mechanical alignment devices are available. Some of these alignment products are cumbersome, others are impractical. Chalk reels, for instance, are readily portable and create reliable alignment markings. However, chalk lines leave imprints on walls and produce chalk dust, both of which are undesirable in a finished room. Plumb bobs are also readily portable, but require anchoring of a string and the bob must come to rest before being relied upon for alignment purposes.

The problems with mechanical alignment devices have been addressed with the advent of portable laser levels. One example of a portable laser level is U.S. Publication No. 20020178596 to Malard, titled "Laser Line Generating Device," the disclosure of which is incorporated herein by reference. The Malard device has several problems. A first problem concerns the way the laser is activated. To activate the laser, a cover must be pivoted away from the laser projector. During the process, the finger used for pivoting the cover is radiated by the laser source. However, in the manufactured form of the Malard device, embodied in the Laser Level by Strait-Line Corporation, an advisory located adjacent to the same cover reads "DANGER, Avoid Direct Exposure to the Beam."

A second problem with the Malard device concerns the method in which the laser apparatus connects to a solid surface. The Malard apparatus requires the use of retractable pins. In use, the pin damages the surface being connected to the apparatus.

In the manufactured version of the Malard device, the problem with the retractable pins has been addressed. The Malard apparatus uses Command Strips manufactured by 3M Corporation for positioning the apparatus on a surface. The Command Strips enable the Malard apparatus to adhere to a surface without damaging the surface. However, the Command Strips contain deficiencies.

The Command Strips consist of a plurality of small porous openings that act as suction-cups when placed against a smooth surface. Accordingly, the Command Strips have problems inherent with suction-cups. If the receiving surface contains any irregularities, the porous opening will fail to grip and the Malard apparatus will fail to adhere to the surface. However, such irregularities are common to surfaces on which the laser is be applied, such as with textured paint or various forms of wall board or wall paper.

Another problem exists when applying the Command Strips against the base of the Malard device. The strips displace the base of the Malard device from the working surface by the thickness of the strips. The displaced device is caused to wobble against the surface due to the compressibility of the strips. The wobbling is incurable because edges of the base are incapable of contacting the working surface due to the strips.

In light of the deficiencies of the prior art, a portable laser level is needed that is capable of being activated without the placement of a finger in the path of the laser. The apparatus should be capable of placement against a textured surface using a reusable adhesive. The base of the device should also be capable of entirely contacting a working surface during the application of the adhesive.

BRIEF SUMMARY OF THE INVENTION

According to a first aspect of the invention, a laser level is adapted to direct a laser path against a working surface. The level comprises a base, the base comprising at least one pair of opposing edges, the base adapted to be positioned relative to the working surface such that each of the opposing edges is adjacent to the working surface. The level comprises an adhesive layer, the adhesive layer being situated on the base so as to removably affix the base on the working surface without damaging the working surface. The level comprising an activating switch, the switch being located on the level at a location offset from the laser path.

According to a further aspect of the invention, the base comprises a recess and wherein the adhesive layer is situated substantially within the recess.

According to a further aspect of the invention, the level has a front surface and a pair of side surfaces, the laser projecting from the front surface and the switch being positioned on one of the side surfaces.

According to a further aspect of the invention, one of each of the opposing edges is contiguous with a different one of each of the side surface.

According to a further aspect of the invention, one of the side surfaces is adapted to be gripped by the fingers of the user and the other of the side surfaces is adapted to be gripped by the thumb of the user, wherein the switch is located such that it can also be engaged by the thumb of the user.

According to a further aspect of the invention, the level further comprises a pair of liquid levels, the liquid levels being substantially perpendicular to each other, the levels being adapted to indicate a planar position of the level on the working surface over a range of three hundred and sixty degrees.

According to a further aspect of the invention, the level further comprises an extension surface having a front and rear edge, the rear edge being connected to the base, the extension surface extending planar to the base and perpendicular to the front surface.

According to a further aspect of the invention, the level comprises an orientation notch, the notch extending from the front edge of the extension surface.

According to a second aspect of the invention, a laser level is adapted to direct a laser path against a working surface. The level comprises a base, the base comprises at least one pair of opposing edges, and adapted to be positioned adjacent to the working surface such that the opposing edges each engage the working surface. The level comprises a tack for piercing a surface to provide orientation control to the level and an activating switch, the switch being situated at a location offset from the laser path during.

According to a further aspect of the invention, the base comprises a recess and wherein the tack is adapted to be stored in the recess.

According to a further aspect of the invention the level comprises a front surface and a pair of side surfaces, the laser projecting from the front surface and the switch being located on one of the side surfaces.

According to a further aspect of the invention, each of the opposing edges is substantially contiguous with a different one of the side surfaces.

According to a further aspect of the invention, one of the side surfaces is adapted to be gripped by the fingers of the user and the other of the side surfaces is adapted to be gripped by the thumb of the user, wherein the switch is located such that it can also be engaged by the thumb of the user.

According to a further aspect of the invention, the laser level comprises a pair of liquid levels, the liquid levels being substantially perpendicular relative to each other, the levels being adapted to indicate a planar position of the level on the working surface over a range of three hundred and sixty degrees.

According to a further aspect of the invention, the level further comprises an extension surface having a front and rear edge, the rear edges being connected to the base, the extension surface extending in the plane of the base and substantially perpendicular to the front surface.

According to a further aspect of the invention, the level further comprises an orientation notch, the notch extending from the front edge of the extension surface.

According to a further aspect of the invention, the level further comprising a pin and a rear extension surface, the surface having an extrusion adapted to be engaged by the pin for providing orientation control to the level.

According to a further aspect of the invention, the level further comprises an adhesive layer, the adhesive layer being adjacent to the base for removably attaching the base to the working surface without damaging the working surface.

According to a further aspect of the invention, the base comprising a recess and wherein the adhesive capable of being positioned substantially within the recess.

BRIEF DESCRIPTION OF THE SEVERAL VIEWS OF THE DRAWINGS

In order that the manner in which the above recited objectives are realized, a particular description of the invention will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which:

FIG. 1 is a perspective view of the laser level according to an aspect of the invention;

FIG. 2 is a another perspective view of the laser level;

FIG. 9 is a perspective view of the laser level illustrating the tack storage area and lid.

DETAILED DESCRIPTION OF THE INVENTION

A laser level is disclosed that utilizes an adhesive for adhering to a working surface. The level has recessed base for placement of the adhesive, and where edges of the recess are capable of maintaining contact with the working surface during the use of the adhesive. The level provides a comfortable gripping surface that helps to prevent the user from pinching fingers against the working surface. The level is capable of being operated without exposing the user's fingers to the laser beam.

Figure 3:
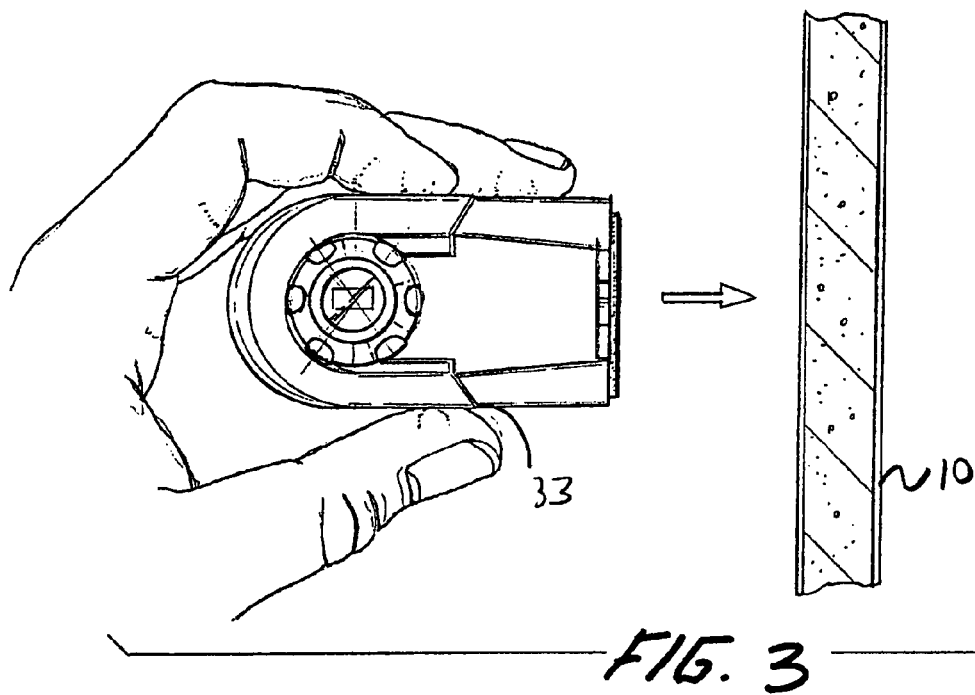
FIG. 3 is a front view of the laser level being applied to a working surface.
Figure 4:
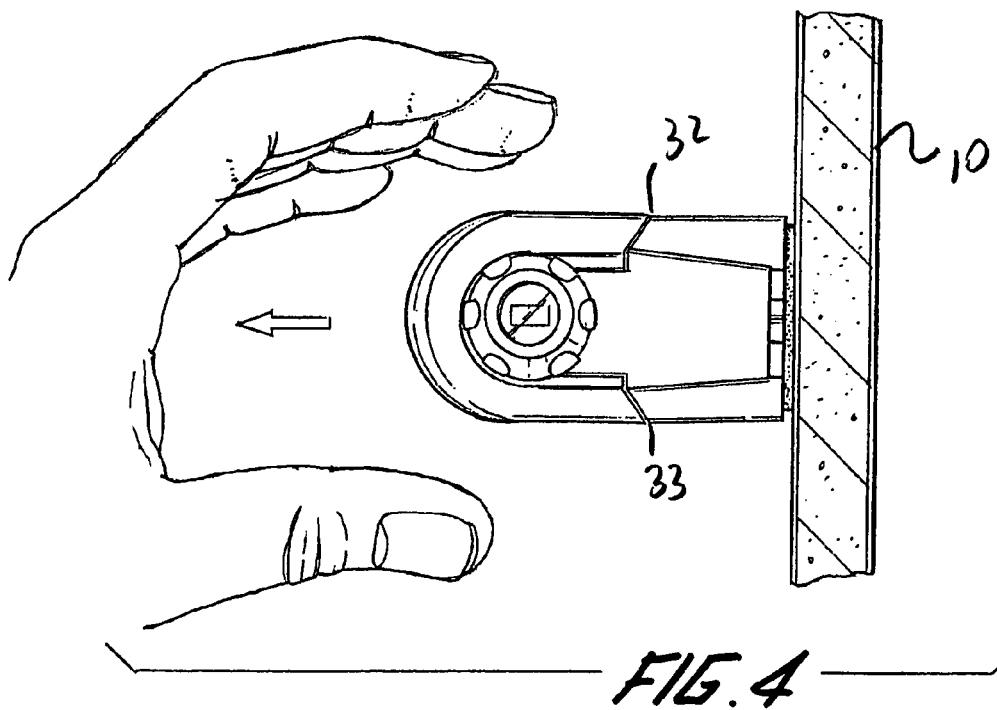
FIG. 4 is a front view of the laser level being removed from the working surface.
Figure 5:
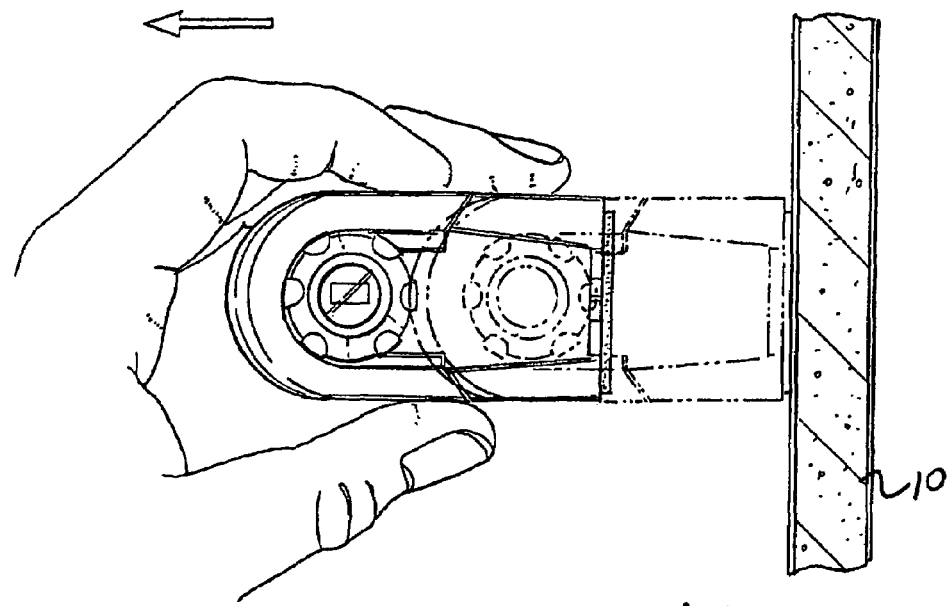
FIG. 5 is another front view of the laser level being removed from a working surface.

Turning to the FIG. 1, to better understand the invention, there is disclosed a laser level 1 having body segments for storing the internal components. The body segments include a base 2, sides 3 and 4 (FIG. 7) perpendicular to the base, and back 5 (FIG. 6) and front 6, both being perpendicular to sides 3 and 4. The level 1 also has surfaces 7 and 8 which join surfaces 3 and 4 to front 6. The level 1 has adhesive tape 9 for connecting the level to a working surface 10 (FIG. 3). The level has an activation switch 11 (FIG. 7) that is removed from direct exposure from the laser.

Turning to FIG. 2, the following disclosure illustrates the level 1 having a recessed base for placement of the adhesive, and where edges of the recess are capable of maintaining contact with the working surface during the use of the adhesive.

The base 2 has a front edge 12, and first and second edges 13 and 14. Front edge 12 has the same length as back 5 and is perpendicular to edges 13 and 14. Side edges 13 and 14 are parallel to each other and have the same length as respective sides 3 and 4. Side edges 13, 14 and front edge 12 forms a plane that is perpendicular with the side surfaces 3 and 4, and perpendicular to back and front surfaces 5 and 6.

At the front end of each edge 13 and 14 are tapered edges 15 and 16. The edges 15 and 16 are planar with the base as defined by respective edges 13 and 14. The edges 15 and 16 are also planar with each respective surface 21 and 20.

The rear of the laser 1, extending from the bottom of back surface 5, is a rear extension surface 22. The rear extension surface 22 has a front end 23 and tapers to a rear tip 24. The distance between the front end 23 and the rear tip 24 is equivalent to half of the distance between each side edge 13 and 14.

The rear extension 23 serves as a rear orientation surface. The tip 24 is capable of being placed against a working surface followed by the base 2 of the laser 1. By first pivoting the body of the laser 1 about the rear tip 24, the rear extension 23 increases the accuracy of the placement of the laser 1.

The rear extension 23 has edges 25 and 26. The edges 25 and 26 are planar with base as defined by edges 13 and 14. The edges 25 and 26 have the same thickness as edges 13 and 14.

Remaining with FIG. 2, the base 2 has a recessed surface 27. The recessed surface is planar and parallel with the plan defined by edges 13 and 14. The surface 27 extends between side edges 13, 14, front edge 12 and rear edges 25 and 26. The surface 27 is recessed enough to seat and substantially conceal removable tape 9. The recess 27 has a depth that is less than the thickness of the tape 9 when the tape is uncompressed. For example, the depth of the recess 27 is equivalent to the thickness of each edge 13 and 14, or substantially an eighth of an inch.

The laser 1 includes a predetermined amount of the reusable adhesive 9. The adhesive is preferably a reusable mastic that provides adhesion to all forms of surfaces, including glass, textured paint and wallboard, and wallpaper. An example of the preferred adhesive is Blu-Tack™ from Bostik.

Referencing FIG. 1, the adhesive 9 has a rectangular surface area, having side edges 28 and 29. The side edges 28 and 29 are separated by a distance that is less than or equal to the internal distance between edges 13 and 14. The edges 28 and 29 are substantially as long as edges 13 and 14. The similar geometry between the adhesive edges 28 and 29, and the base edges 13 and 14, provides the adhesive 9 with the maximum allowable surface area when placed within the recess 27. The maximum surface area correlates to the maximum adhesion by the adhesive 9 against the working surface 10. The adhesive 9 has an uncompressed thickness of approximately a sixteenth of an inch greater than the dept of the recess 27.

The adhesive 9 has front and rear substantially parallel edges 30 and 31. The edges are substantially perpendicular to edges 28 and 29. The edges 28 and 29 are separated by a distance that is less than or equal to the distance between rear edge 23 and front edge 12. The maximum surface area for the adhesive 9 is when edges 28 and 29 meet edges 23 and 12, and when edges 28 and 29 meet edges 13 and 14.

The surface area of the adhesive 9 is smaller than the surface area of the recess 27 because the laser 1 extends beyond the adhesive edges 30 and 31. The difference in the surface areas allows the adhesive 9 to compress and spread when the laser 1 is pressed against the working surface 5.

Figure 6:
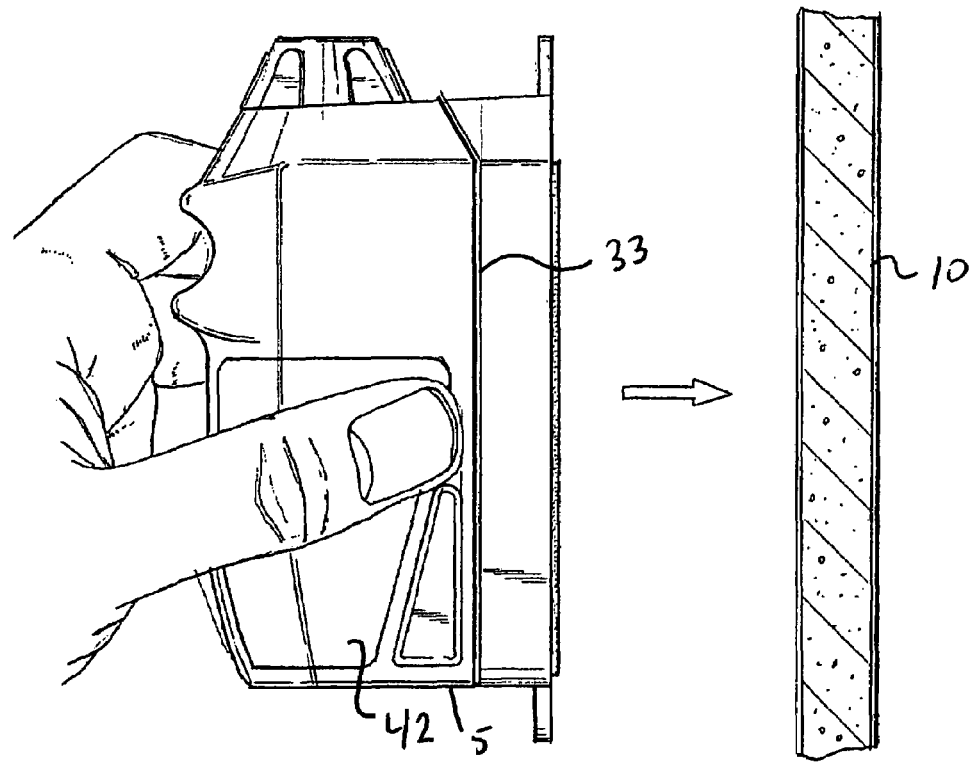
FIG. 6 is a side view of the laser level being applied to a working surface.

In use, the adhesive 9 is applied against the laser 1 within the recess 27, as disclosed in FIGS. 3 and 6. The laser 1 is then positioned against the working surface 10. While being positioned, the orientation tip 24 is pivoted against the working surface 5, assisting in determining the appropriate orientation of the laser 1.

Once the orientation of the laser 1 is chosen, the base 1 of the laser 1 is pressed against the working surface 10. The adhesive 9 is compressed to fit within the recess 27 so that the edges 13 and 14 rest against the working surface 10. The laser 1 rests firmly against the working surface 10 allowing the laser to maintain an adhered position.

Figure 8:
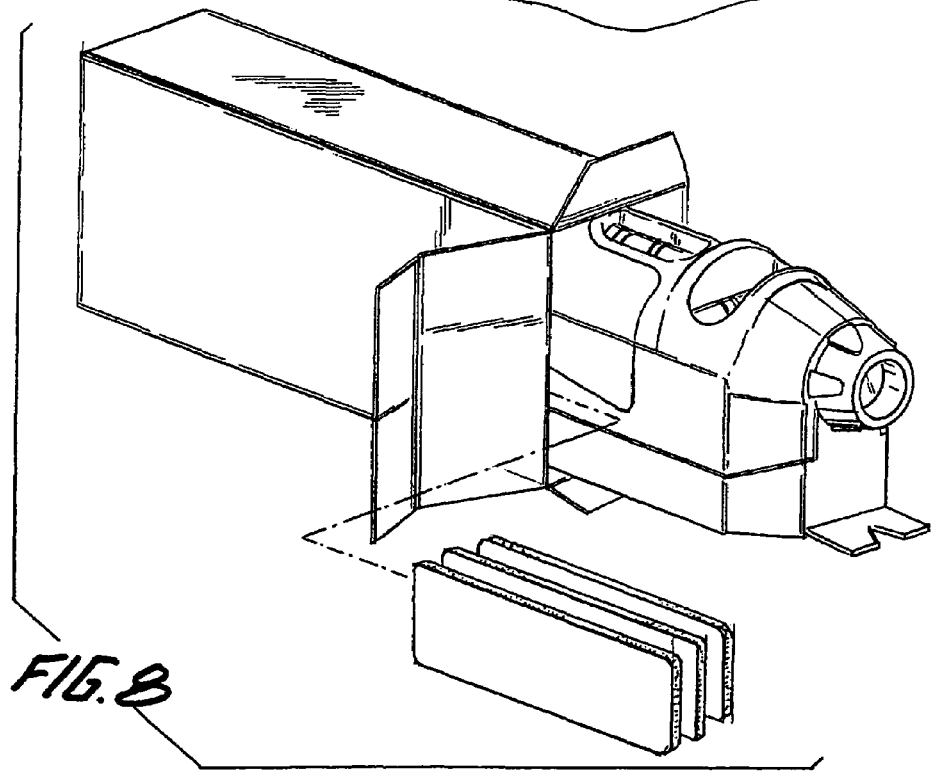
FIG. 8 is a perspective view of the components of the laser level.

Once the laser is removed from the working surface, the adhesive 9 is removed from the laser recess 27. As indicated, surface are of the recess 27, in front and back of the laser base 2 are free from adhesive. These regions are capable of being utilized for prying the adhesive 9 from the recess 27. Turning to FIG. 8, the adhesive is capable of being stored with the deactivated laser 1 for future use.

Figure 7:
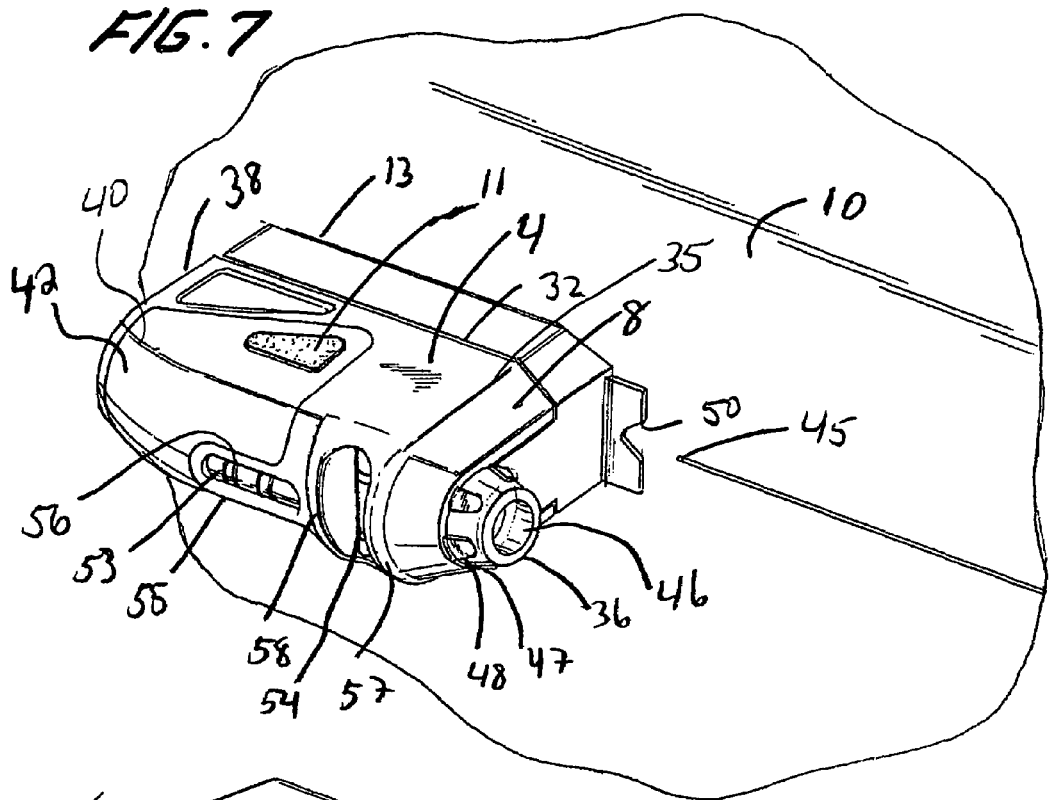
FIG. 7 is a perspective view of the laser level as applied to a working surface.

Referencing FIGS. 1, 2 and 7, the following disclosure illustrates the level providing a comfortable gripping surface that helps to prevent the user from pinching fingers against a working surface.

Each side surface 3 and 4 has an intermediate edge 32 and 33. Each intermediate edge 32 and 33 is separated from the base 2 by the same distance. The purpose of the intermediate edges 32 and 33 is to define a safety zone for gripping by a user. Specifically, the laser 1 is designed to be gripped above intermediate edges 32 and 33. Gripping the laser 1 above the intermediate edges 32 and 33 assures that fingers will not be pinched against a working surface 10. In the illustration, the distance between the bottom edges 32 and 33 and the base 2 is approximately half of an inch.

Each side surface 32 and 33 has a front edge 34 and 35. The front edge 34 and 35 is separated from the laser by a distance that assures that fingers of a user will not engage the beam radiated by the laser diode. In the illustration the distance between each front edge 34 and 35 and the laser 36 is the same distance that separates the bottom side edges 32 and 33 from the bottom base 2.

Each side 3 and 4 further has a back edge 37 and 38. The back edges 37 and 38 are separated from the respective front edges 34 and 35 by a distance that allows for the storage and operation of the internal components of the laser 1. The distance between these edges also allows for the comfortable placement of fingers on one side 3 and a thumb on the other side 4. In the illustration, the distance between the edges 37 and 38, and edges 34 and 35 is three and a quarter inches.

Surfaces 3 and 4 each have a top edge 39 and 40. The top edges 39 and 40 are mutually parallel and separated from respective edges 32 and 33 by a distance that allows the placement and operation of internal laser components. The distance also allows a comfortable grip by a user. In the illustration, the edges 39 and 40 are separated from respective edges 32 and 33 by approximately an inch an a half, or three times the distance between the bottom edges 32 and 33 and the base 2.

Each top edge 39 and 40 tapers towards the back surface 5. The purpose of the taper is to substantially mirror a taper on front surfaces 7 and 8, providing a more comfortable grip and weight balance to the laser 1.

Surfaces 3 and 4 are distanced from each other for allowing for the storage and operation of internal components of the laser 1. The separation distance also assists in providing a comfortable grip. The distance between surfaces 3 and 4 is substantially half of the length of the surfaces 2 and 4 as defined by the length of edges 32 and 33. In the illustration, the distance between surfaces 3 and 4 is an inch and a half.

The laser 1 has a top surface 41. The top surface 41 defines a semi-circle for the purposes of eliminating sharp edges which could injure a user. The radius of the semi-circle is substantially consistent with the separation between edges 39 and 40 along the length of surfaces 3 and 4.

The laser 1 has a texture 42 that is capable of being gripped. The texture 42 is located above the intermediate edges 32 and 33, and serves as a guide for a user to grip when operating the laser 1. If gripped on the texture 42, the users are unlikely to injure themselves by pinching a hand against a surface or becoming exposed to the laser beam.

The texture 42 consists of impressions. Alternatively, the texture 42 consists of a color variation in the skin of the laser. Alternatively, the texture 42 consists of a combination of impressions and color variations.

In use, the laser 1 provides the user with various physical indicators of where to safely grip the laser 1. Turning to FIGS. 3 through 6, the user grips the user above the intermediate edges and within the gripping texture 42. If the user follows the indicators, the user is protected from pinching a finger against a working surface 5.

Referencing FIGS. 6 and 7, the following disclosure illustrates the level 1 capable of being operated without exposing the user's fingers to the laser beam.

The actuating button 11 is located on the gripping surface 42 on the side surface 4. The location of the button 11 allows for a comfortable actuation by the thumb of a user. For example the button 11 is located in substantially the center of the surface, between top and intermediate edges 40 and 32, and front and back edges 35 and 38. The size of the button enables comfortable use by a person.

Forward of the side surfaces 3 and 4, the laser 1 tapers inwardly on surfaces 7 and 8. The taper of the surfaces provides a visual and physical indicator to the user that fingers placed beyond that point are close to the laser beam. The front edge of surfaces 7 and 8 are tapered to sixty percent of the rear edges of surfaces 7 and 8, or approximately one inch.

In front of the tapered surfaces 7 and 8 is a nozzle 43. The nozzle 43 has an internal diameter and length that, when combined, assist in preventing a person from looking directly into the source of the laser beam. The nozzle also prevents the trailing edge of the laser beam 45 from fanning close to the front edge 44. Forcing the trailing edge of the laser 45 outward helps prevent fingers of a user from exposure from the laser when positioning the laser body.

The internal diameter 46 and length 47 of the nozzle 43 are approximately equal in dimension. In the illustration, the diameter 46 of the nozzle is approximately half of an inch.

The forward edge 47 of the nozzle 43 is thick enough to withstand normal use. For example, the thickness of the forward edge is substantially a quarter of an inch.

The nozzle has an outer surface 48 that tapers outwardly towards tapered surfaces 6 and 7. The outward taper of surface 48 allows for an essentially continuous surface between the nozzle 43 and the laser 1. The continuous surface assists in deflecting forces that impinge the nozzle 43 during use.

In use, the user maintains the grip of the laser and depresses the button 11 to activate or deactivate the laser beam. The user is capable of seeing and feeling the taper of surfaces 6 and 7 to determine that fingers are being placed too closely to the laser beam. Accordingly, it is improbable that actuating the laser beam will exposes the gripping fingers or thumb of a user to direct contact with the radio-active laser beam.

Referencing FIGS. 1 and 2, the following disclosure illustrates the level 1 having components for assisting in being orientated against a working surface 5.

The base 2 has a front extension surface 49. The surface 49 provides extra stability for the laser when placing the laser on a work surface. The surface 49 also provides stability to the laser if storing the laser with the nozzle 43 in a face-downward position. The extension further protrudes from the laser by the same distance as the projection of the nozzle.

The extension surface 49 has an orientation notch 50. The notch 50 provides for an accurate visible assessment of a surface upon which the laser is being placed. The notch 50 forms an approximately sixty degree angle and has an apex 51 that projects towards the laser to about half of the length of the surface 50.

In an alternative embodiment, at least one pin is used for orienting and mounting the laser 1 against a surface 10. The rear extension 24 has a pin whole 51 capable of receiving the pin from a thumb tack. A second tack is capable of being placed on the innermost edge of the orientation notch 51.

Turning to FIG. 9, the laser 1 has a chamber 52 for storing the at least one thumb tack 59. The chamber 52 is positioned entirely below a battery bank 53, where the battery bank 53 is positioned below the planar recessed surface 27, and underneath a cap for the battery bank 61. The battery bank holds, for example, two AAA batteries 62. Preferably, the chamber 52 is large enough to hold at least two thumb tacks so that the batteries and tacks remain separated when stored in the laser 1. The chamber has restraining walls 60 for gripping the needles 63 of the tacks. The restraining walls 60 prevent the needles 63 from accidentally injuring a person that is either changing the batteries 62 or attempting to retrieve the tacks 59.

Returning to FIG. 1, forward of the gripping section on the top surface 41, the laser has a pair of mutually perpendicular liquid levels 53 and 54. The levels work in a customary manner. For example, when the base 2 is vertically disposed, the liquid levels 53 and 54 enable the positional tracking of the level 1 over a range of 360 degrees. The size of the levels 53 and 54 allows for reliable indications of orientation and allow for manageable placement within the top surface 41 of the laser 1. For example, each level 53 and 54 has a visible length of substantially an inch and visible diameter of substantially half of an inch.

The liquid levels 53 and 54 are surrounded by protective edges 55, 56, 57 and 58. The protective edges prevent the damaging of the levels 53 and 54 during use.

Accordingly, laser level has been disclosed that utilizes an adhesive for adhering to a working surface. The level has recessed base for placement of the adhesive, and where edges of the recess are capable of maintaining contact with the working surface during the use of the adhesive. The level provides a comfortable gripping surface that helps to prevent the user from pinching fingers against the working surface. The level is capable of being operated without exposing the user's fingers to the laser beam.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

I claim:

1. A laser level adapted to direct a laser path against a working surface, said level comprising:
   a base, said base comprising at least one pair of opposing edges, said base capable of being positioned relative to the working surface such that each of said opposing edges is adjacent to the working surface;
   said base having a surface adapted to face the working surface, said base surface having a recess therein;
   an adhesive layer, said adhesive layer being at least partially situated within said recess in said base surface so as to removably affix said base surface on the working surface without damaging the working surface; and
   an activating switch, said switch being located on said level at a location offset from said laser path.

2. The level of claim 1 wherein said level has a front surface and a pair of side surfaces, said laser projecting from said front surface and said switch being positioned on one of said side surfaces.

3. The level of claim 2 wherein one of said side surfaces is adapted to be gripped by the fingers of the user and the other of said side surfaces is adapted to be gripped by the thumb of the user, wherein said switch is located such that it can also be engaged by the thumb of the user.

4. The level of claim 1 further comprising:
   a pair of liquid levels, said liquid levels being substantially perpendicular to each other, said levels being adapted to indicate a planar position of said level on the working surface over a range of three hundred and sixty degrees.

5. The level of claim 4 further comprising an extension surface having a front and rear edge, said rear edge being connected to said base surface, said extension surface extending planar to said base and perpendicular to said front surface.

6. The level of claim 5 comprising an orientation notch, said notch extending from said front edge of said extension surface.

7. The level of claim 1 further comprising
   a tack for piercing a surface to provide orientation control to said level.

* * * * *